United States Patent [19]
Corliss et al.

[11] Patent Number: 5,611,330
[45] Date of Patent: Mar. 18, 1997

[54] INDUCED DRAFT FRYER

[75] Inventors: John M. Corliss, Arlington; Robert Rounds, III, Cambridge, both of Mass.

[73] Assignee: Gas Research Institute, Chicago, Ill.

[21] Appl. No.: 416,632

[22] Filed: Apr. 5, 1995

[51] Int. Cl.$^6$ ................................. A47J 27/00
[52] U.S. Cl. .................. 126/391; 126/392; 126/357; 126/390
[58] Field of Search .................. 126/391, 392, 126/343.5 A, 357, 390; 99/403, 330

[56] References Cited

U.S. PATENT DOCUMENTS

| | | | |
|---|---|---|---|
| 3,217,704 | 11/1965 | Anetsberger | 126/391 |
| 3,712,289 | 1/1973 | Reid, Jr. et al. | 126/391 |
| 4,397,299 | 8/1983 | Taylor et al. | 126/391 |
| 4,602,612 | 7/1986 | Schwizer | 126/391 |
| 4,848,318 | 7/1989 | Brewer | 126/390 |
| 4,905,664 | 3/1990 | Dunham | 126/391 |
| 4,913,041 | 4/1990 | Taber et al. | 99/403 |
| 4,945,890 | 8/1990 | Ripka | 126/110 R |
| 4,993,402 | 2/1991 | Ripka | 126/361 |
| 5,033,368 | 7/1991 | Brewer | 99/403 |

*Primary Examiner*—Larry Jones
*Attorney, Agent, or Firm*—Speckman, Pauley & Fejer

[57] ABSTRACT

An induced draft, fossil fuel fired, deep fat fryer comprising a fluid container, a fluid container housing wall disposed around a portion of said fluid container, forming at least one combustion gas chamber between the fluid container and the fluid container housing wall, the combustion gas chamber having a combustion air inlet opening and a combustion product gas exhaust opening, a burner for combustion of a fuel/air mixture, forming a combustion product gas in the combustion gas chamber, a baffle guiding the combustion product gas into heat transfer communication with the fluid container, and a blower for inducing a subatmospheric pressure condition in the combustion gas chamber, the blower disposed downstream of the combustion product gas exhaust opening and in communication with the combustion product gas exhaust opening.

13 Claims, 1 Drawing Sheet

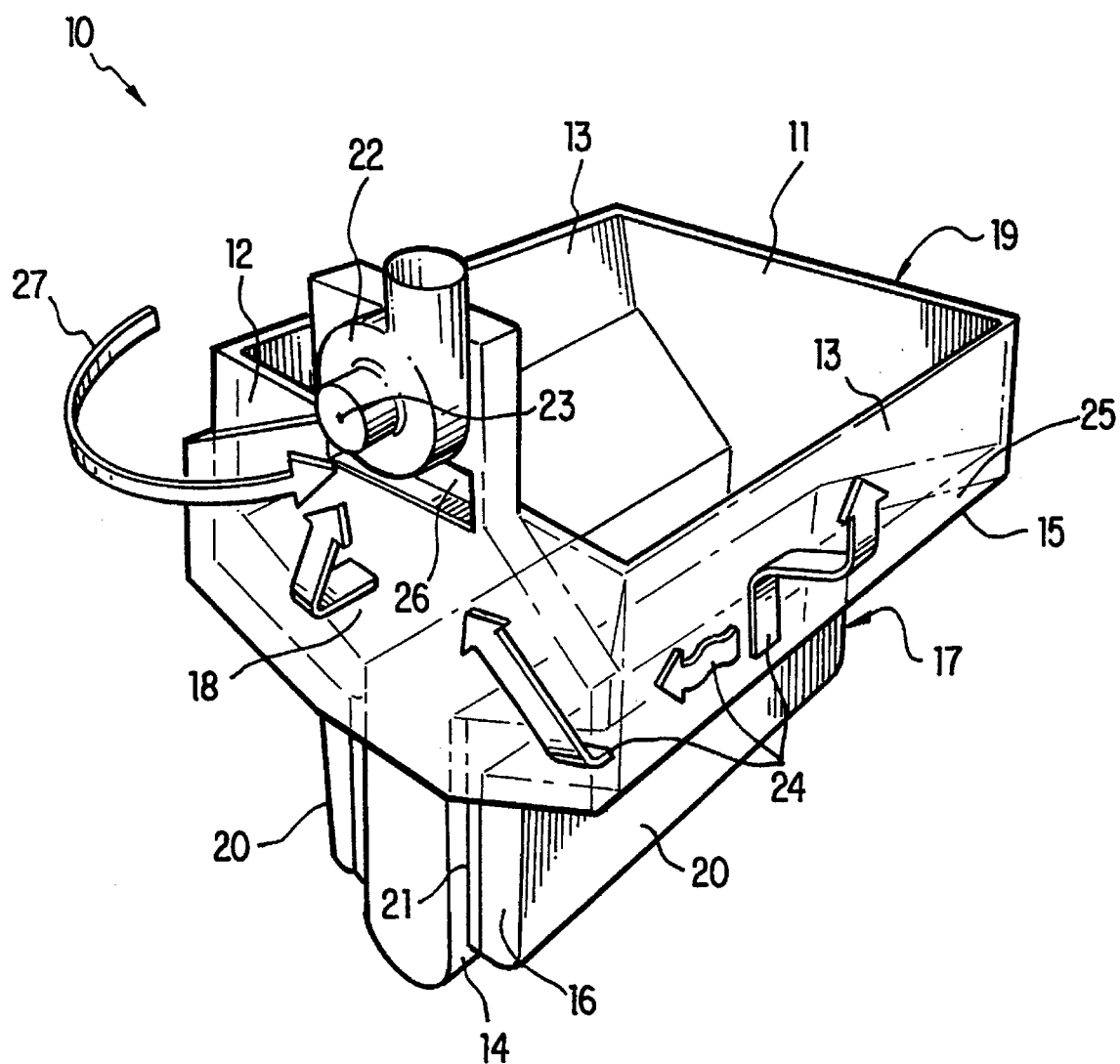

INDUCED DRAFT FRYER

BACKGROUND OF THE INVENTION

1. Field of the Invention

This invention relates to a fossil fuel-fired, fluid heating apparatus having a fluid container disposed within a combustion chamber in which combustion air is drawn into the combustion chamber through a combustion air inlet opening and combustion product gas is drawn through the combustion gas chamber and exhausted whereby the pressure within the combustion chamber is slightly less than atmospheric. More particularly, this invention relates to a natural gas-fired, induced-draft fryer.

2. Description of Prior Art

Known deep-fat fryers, such as are taught by, for example, U.S. Pat. No. 4,397,299, U.S. Pat. No. 4,602,612, U.S. Pat. No. 4,913,041, U.S. Pat. No. 4,848,318, U.S. Pat. No. 3,712,289, U.S. Pat. No. 3,217,704, and U.S. Pat. No. 4,905,664 are forced air systems in which combustion air is blown into the burner for heating the cooking medium with a fan, causing the burner system to operate at a slightly positive pressure. As a result, after continued use, these positive pressure fryers often develop leaks around the gasketing at the burner/frypot interface and elsewhere within the flue gas passage and, thus, constituting a substantial reliability weakness. These leaks result in high temperature flue gases, on the order of 700° F.–900° F. leaking into the fryer cabinet area, adversely affecting electronics and other temperature-sensitive components therein.

This invention essentially eliminates the leakage of flue gases into the fryer cabinet area and, thus, increases fryer reliability, by providing a suction on the flue gases, thereby causing the burner system to operate at a slightly subatmospheric pressure. As a result, any leakage that does occur will be into the combustion system and not into the fryer cabinet area.

U.S. Pat. No. 4,945,890 teaches an induced draft warm air furnace having a radiant infrared burner in which the use of an induced draft is indicated to eliminate the possibility of combustion gases leaking out of the combustion chamber or heat exchanger thereof. Similarly, U.S. Pat. No. 4,993,402 teaches a fuel-efficient, rapid, water heating module in which an induction draft fan is employed for causing a flow of combustion gases from the burner cavity, through the tank flue, the preheater jacket, and out to an external flue. In both apparatuses, the combustion chambers are sealed in a manner which prevents the inflow of secondary air into the combustion chamber due to operation of the devices at subatmospheric conditions within the combustion chambers. That is, the fuel and primary combustion air are premixed prior to introduction into the combustion chamber and subsequent combustion thereof.

SUMMARY OF THE INVENTION

It is an object of this invention to provide a gas-fired deep fat fryer of substantially greater reliability than conventional forced-draft deep fat fryers.

It is another object of this invention to provide a gas-fired deep fat fryer which substantially eliminates the leakage of flue gases from the combustion chamber into the fryer cabinet area and other sensitive areas.

It is yet another object of this invention to provide a gas-fired deep fat fryer which is substantially less expensive than conventional forced-air fryers to manufacture by substantially eliminating the requirement for gaskets between the combustion chamber and fryer cabinet area.

These and other objects of this invention are achieved by a fluid heating apparatus comprising a fluid container, a fluid container housing wall disposed around a portion of the fluid container, forming at least one combustion gas chamber between the fluid container and the fluid container housing wall, said at least one combustion gas chamber having a combustion air inlet opening for admission of primary combustion air into the combustion gas chamber and a combustion products gas exhaust opening, and burner means for combustion of a fuel/air mixture, forming a combustion product gas in the combustion gas chamber. To provide heat transfer from the combustion product gas to the fluid container, guide means for guiding the combustion product gas from the combustion chamber in heat transfer communication with the fluid container are provided. To prevent the leakage of combustion product gases from within the combustion gas chamber, the fluid heating apparatus of this invention further comprises blower means for inducing a subatmospheric pressure condition within the combustion gas chamber, the blower means being disposed downstream of the combustion product gas exhaust opening and in communication with the combustion product gas exhaust opening.

In accordance with one preferred embodiment of this invention, the fluid heating apparatus further comprises a partition wall disposed within the combustion gas chamber and extending, preferably from one perimeter area of said fluid container to another perimeter area of said fluid container, so as to divide the combustion gas chamber into at least two separate combustion gas chambers. Each of said combustion gas chambers forms a combustion air inlet opening and a combustion product gas exhaust opening. The fluid heating apparatus further comprises burner means corresponding to each of said combustion gas chambers. In accordance with this embodiment of the invention, blower means are provided which comprise means for independently drawing combustion air through each of the combustion air inlet openings of each of the combustion chambers and for independently drawing the combustion product gas through each of the combustion gas chambers and independently exhausting the combustion product gas from each of the combustion gas chambers. As a result, it is possible, if desired, to operate the combustion chambers independently, thereby enabling independent firing of each side of the fryer.

A process for heating a fluid in a fluid container in accordance with one embodiment of this invention comprises drawing combustion air through a combustion gas chamber opening, mixing the combustion air with a fuel and combusting the resulting fuel/combustion air mixture in said combustion gas chamber forming combustion product gas, drawing the combustion product gas with a blower means through a passageway formed by a baffle means so as to provide thermal communication of the combustion product gas with the exterior surface of the fluid container, whereby heat is transferred into the fluid container to heat the fluid. A critical element of the process of this invention is the maintaining of a substantially subatmospheric pressure in the combustion gas chamber and passageway through which the combustion product gas is drawn. In this way, leakage of the combustion product gas out of the combustion gas chamber is precluded.

BRIEF DESCRIPTION OF THE DRAWINGS

These and other objects and features of this invention will be better understood from the following detailed description taken in conjunction with the sole drawing which shows a diagram of a fluid heating apparatus in accordance with one embodiment of this invention.

DESCRIPTION OF PREFERRED EMBODIMENTS

The sole figure shows a fluid heating apparatus 10 in accordance with one embodiment of this invention comprising a fluid container 19 in which the fluid to be heated, such as cooking oil, is retained. Fluid container 19 comprises front wall 11, rear wall 12, side walls 13 and bottom wall 14. Disposed around fluid container 19 is a housing wall 15 which forms a combustion gas chamber 16 in the area between housing wall 15 and the walls comprising fluid container 19.

Combustion gas chamber 16 forms combustion air inlet opening 17 through which combustion air is drawn, as a result of the subatmospheric pressure created by blower 22 within combustion gas chamber 16, into combustion gas chamber 16 where it mixes with fuel from burner 20, preferably an infrared burner, resulting in ignition of burner 20 and combustion of the fuel/combustion air mixture to form combustion product gases.

The combustion product gases are drawn by blower 22 through passageways 25 adjacent to fluid container 19, guided by guide means in the form of baffle 21 to contact the exterior surfaces, at least side walls 13 and/or bottom wall 14, of fluid container 19 as indicated by arrows 24, so as to provide heat exchange between the combustion product gas and the fluid disposed within fluid container 19 through the fluid container side walls 13 and bottom wall 14. The baffle 21 is designed to provide substantially even distribution of heat to the fluid within fluid container 19.

Blower 22, which is in gas communication with combustion gas chamber 16, pulls combustion product gas from within combustion gas chamber 16 through combustion product gas exhaust opening 18 of combustion gas chamber 16 and expels the combustion product gas into a flue (not shown).

In accordance with one preferred embodiment of this invention, said blower means comprises dilution air means in the form of an opening 26 in housing wall 15 upstream of blower 22 whereby dilution air, indicated by arrow 27, is drawn by blower 22 through its suction side into the combustion product gas stream flowing through combustion product gas exhaust opening 18 and mixed therewith, primarily to reduce the temperature of the combustion product gases being drawn through blower 22 to satisfy any size and temperature requirements of blower 22.

In accordance with one preferred embodiment of this invention, combustion gas chamber 16 is partitioned into at least two separate chambers, each chamber being independently heated by burners 20, one of which is shown in the drawing extending along each side of the apparatus. As a result, each combustion gas chamber is capable of being independently operated.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A fluid heating apparatus comprising:

a fluid container;

a fluid container housing wall disposed around a portion of said fluid container, forming at least one combustion gas chamber between said fluid container and said fluid container housing wall, said at least one combustion gas chamber having a combustion air inlet opening and a combustion product gas exhaust opening;

burner means for combustion of a fuel/air mixture, forming a combustion product gas in said at least one combustion gas chamber;

guide means for guiding said combustion product gas in heat transfer communication with said fluid container; and blower means for inducing a subatmospheric pressure condition in said at least one combustion gas chamber, said blower means disposed downstream of said combustion product gas exhaust opening and in communication with said combustion product gas exhaust opening.

2. A fluid heating apparatus in accordance with claim 1, wherein said blower means comprises dilution air means for mixing dilution air with said combustion product gas from said at least one combustion gas chamber.

3. A fluid heating apparatus in accordance with claim 1, wherein said burner means comprises at least one infrared burner disposed along a wall of said fluid container.

4. A fluid heating apparatus in accordance with claim 3 further comprising a partition wall disposed within said at least one combustion gas chamber and extending from a front end to a rear end of said fluid container, said partition wall dividing said at least one combustion gas chamber into at least two combustion gas chambers, and each of said at least two combustion chambers having one said combustion air inlet opening and one said combustion product gas exhaust opening.

5. A fluid heating apparatus in accordance with claim 4, wherein said blower means comprises means for independently drawing said combustion air through each of said combustion air inlet openings and for independently drawing said combustion product gas through each of said at least two combustion gas chambers and independently exhausting said combustion product gas from each of said at least two combustion gas chambers.

6. A fluid heating apparatus comprising:

a fluid container having a front wall, a rear wall, a plurality of side walls and a bottom wall;

a fluid container housing wall disposed around said plurality of side walls and said bottom wall and forming at least one combustion gas chamber between said fluid container and said fluid container housing wall, said at least one combustion gas chamber having a combustion air inlet opening and a combustion product gas exhaust opening;

burner means for combustion of a fuel/air mixture, forming a combustion product gas in said at least one combustion gas chamber;

guide means for guiding said combustion product gas in heat transfer communication with said fluid container; and blower means for drawing combustion air through said combustion air inlet opening and for drawing said combustion product gas through said at least one combustion gas chamber and exhausting said combustion product gas from said at least one combustion gas chamber, said blower means disposed downstream of said combustion product gas exhaust opening and in communication with said combustion product gas exhaust opening.

7. A fluid heating apparatus in accordance with claim 6, wherein said blower means comprises dilution air means for mixing dilution air with said combustion product gas from said at least one combustion gas chamber.

8. A fluid heating apparatus in accordance with claim 6, wherein said burner means comprises at least one infrared burner disposed along each side of said fluid container.

9. A fluid heating apparatus in accordance with claim 8 further comprising a partition wall disposed within said at least one combustion gas chamber and extending from said front wall to said rear wall of said fluid container, said partition wall dividing said at least one combustion gas chamber into at least two combustion gas chambers, one of said at least two combustion chambers disposed along each said side wall of said fluid container, and each of said at least two combustion chambers having one said combustion air inlet opening and one said combustion product gas exhaust opening.

10. A fluid heating apparatus in accordance with claim 9, wherein said blower means comprises means for independently drawing said combustion air through each of said combustion air inlet openings and for independently drawing said combustion product gas through each of said combustion gas chambers and independently exhausting said combustion product gas from each of said combustion gas chambers.

11. A process for heating a fluid in a fluid container comprising:

said combustion gas chamber, forming combustion product gas;

drawing said combustion product gas with a blower means through a passageway formed by a baffle means, said passageway in thermal communication with the exterior surfaces of said fluid container whereby heat is transferred into said fluid container, heating said fluid, and said blower means maintaining a substantially subatmospheric pressure in said combustion gas chamber and said passageway; and exhausting said combustion product gas from said passageway.

12. A process in accordance with claim 11, wherein said combustion product gas exhausted from said passageway is diluted with dilution air.

13. A process in accordance with claim 11, wherein said blower means is disposed at a downstream end of said passageway.

* * * * *